United States Patent

[11] 3,623,506

| [72] | Inventors | Joseph A. Bonner<br>Pittsburgh;<br>Howard J. Evans, New Kensington, both of Pa. |
|---|---|---|
| [21] | Appl. No. | 859,712 |
| [22] | Filed | Sept. 22, 1969 |
| [45] | Patented | Nov. 30, 1971 |
| [73] | Assignee | Rockwell Manufacturing Company<br>Pittsburgh, Pa. |

[54] SERVICE REGULATOR WITH HIGH-LOW PRESSURE CUTOFF DEVICE
17 Claims, 3 Drawing Figs.

[52] U.S. Cl. .................................................. 137/613,
137/461, 137/505.46, 137/484.4
[51] Int. Cl. ........................................................ F16k 17/22
[50] Field of Search............................................. 137/613,
116.5, 461, 463, 512.5, 513.3, 505.46, 625.64,
484.4

[56] References Cited
UNITED STATES PATENTS

| 3,164,149 | 1/1965 | White | 137/484.4 |
| 2,731,026 | 1/1956 | Hughes | 137/461 |
| 2,800,918 | 7/1957 | Wight | 137/461 |
| 2,955,617 | 10/1960 | Collins | 137/625.64 |
| 3,032,054 | 5/1962 | Irwin | 137/116.5 |
| 3,228,417 | 1/1966 | Schwerter | 137/461 |

Primary Examiner—Laverne D. Geiger
Assistant Examiner—William H. Wright
Attorney—Strauch, Nolan, Neale, Nies & Kurz ABSTRACT: A gas pressure regulator comprises a body having an inlet and an outlet and internal opposed annular valve seats surrounding a flow passage. A main diaphragm controlled valve assembly responsive to downstream gas pressure has a valve head adapted to be located relative to one valve seat to normally provide a substantially constant downstream pressure. A cutoff valve assembly at the other side of said wall comprises a movably mounted valve member adapted to engage the other valve seat.

Independent mechanisms are provided for automatic spring powered movement of said cutoff valve member to closed position when the downstream gas pressure is above or below predetermined limits.

INVENTORS
JOSEPH A. BONNER
HOWARD J. EVANS

BY Strauch, Nolan, Neale, Nies & Kurz
ATTORNEYS

INVENTORS
JOSEPH A. BONNER
HOWARD J. EVANS

SERVICE REGULATOR WITH HIGH-LOW PRESSURE CUTOFF DEVICE

This invention relates to gas pressure regulators of the type wherein an inlet pressure such as a mains line pressure is accurately controlled and modified so that a substantially constant outlet pressure is supplied to a point of use such as domestic and industrial gas appliances and the like.

In the preferred embodiment the invention will be disclosed as specifically applied to a gas pressure regulator of the type wherein a throttle valve is connected by motion transmitting mechanism such as a bellcrank lever to an outlet pressure-responsive member such as a flexible diaphragm exposed to the outlet pressure on one side and spring-biased in opposition to that pressure. Such a regulator is disclosed for example in Pommerscheim U.S. Pat. No. 3,042,064.

When functioning properly these regulators provide an accurately reasonably constant outlet pressure that permits safe, reliable and efficient operation of the appliances. However, problems arise when the outlet pressure is too high, as may occur when the motion-transmitting mechanism between the diaphragm and throttle valve is broken; and also when the outlet pressure is too low for efficient operation of the appliances and their related controls, which may be due to excessively low inlet pressure. Both of these conditions are undesirable in that they affect the efficiency of the appliances, and the excessive high pressure condition is particularly unsafe.

As disclosed in said Pommerscheim patent and in such patents as Schwerter U.S. Pat. No. 3,228,417 and Kruznan et al. U.S. Pat. No. 3,424,194 it has been proposed to provide protection against an undesirably high outlet pressure, by providing automatic relief of the condition when a predetermined high outlet pressure is reached. Pommerscheim provides an automatic relief passage. The other two patents provides for automatic positive cutoff of all gas flow through the regulator when a predetermined high outlet pressure is reached.

The present invention constitutes improvement over the types of regulators disclosed in the Schwerter and Kruznan et al. patents by providing an improved high-pressure cutoff arrangement and also an associated low outlet pressure cutoff whereby the regulator is automatically closed against gas flow therethrough whenever the outlet gas pressure falls below or rises above a predetermined pressure range, and these are the major objects of the invention.

Further objects of the invention involve structural details in the novel combination including a novel single cutoff valve assembly that is operated to effect the cutoff at either the low- or high-cutoff pressure, a special latched and automatically unlatched stem acting on the cutoff valve assembly for high-pressure cutoff, and a separate special low-pressure cutoff mechanism acting on the cutoff valve assembly.

Further objects of the invention will appear as the description proceeds in connection with the accompanying drawings wherein.

Figure 1:
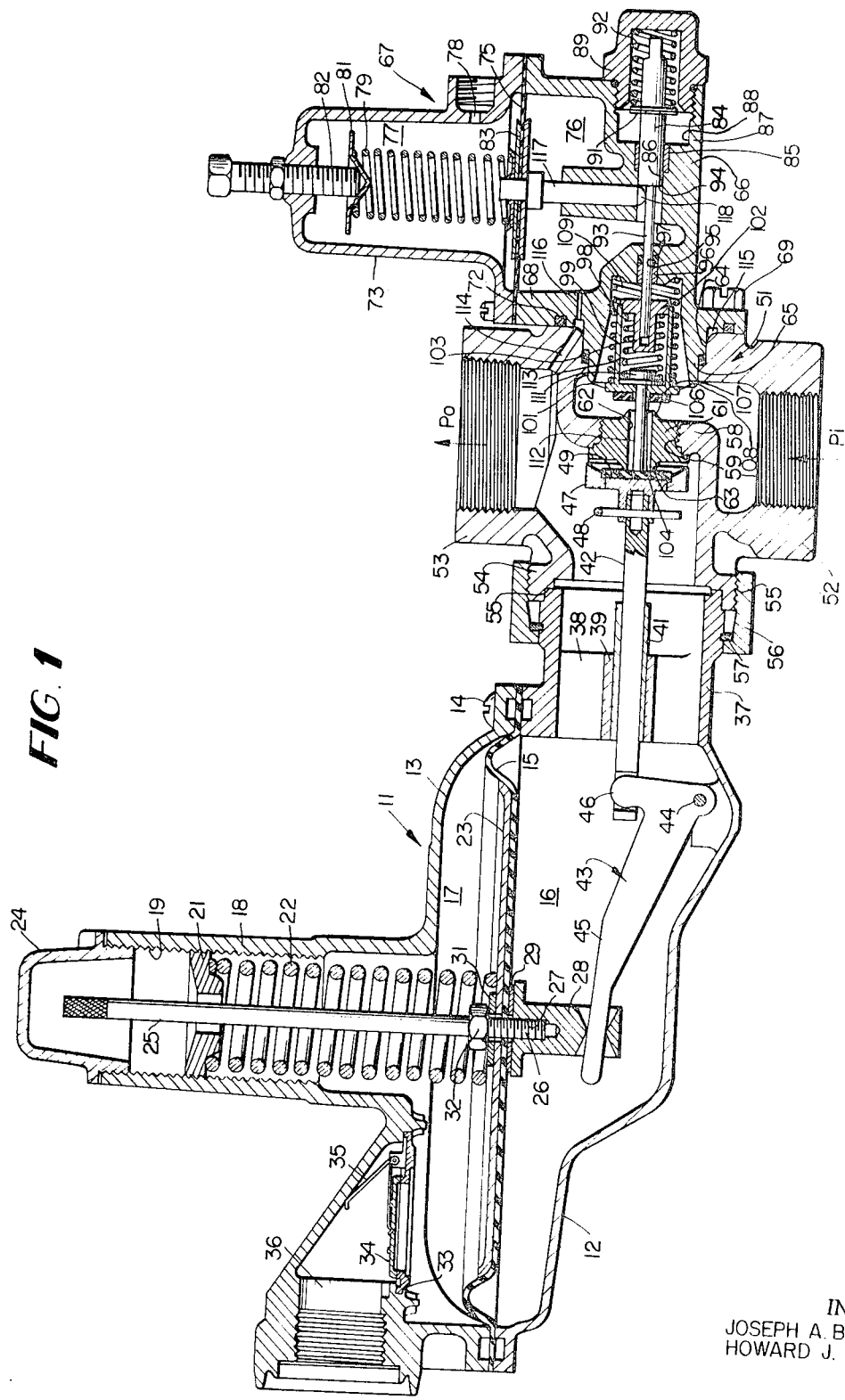
FIG. 1 is a sectional view showing details of a pressure regulator incorporating a preferred embodiment of the invention.

Referring to FIG. 1 the pressure regulator comprises a main diaphragm case 11 having a bottom member 12 and a cover member 13 secured to the bottom member by a row of screws 14. A flexible diaphragm 15 has its outer periphery clamped gastight between the bottom and cover members. Diaphragm 15 separates the interior of case 11 into a main control pressure chamber 16 and a spring chamber 17.

Cover 13 is formed with a central hollow boss 18 having an internally threaded bore 19. An annular nut 21 is rotatable in bore 19. A coil spring 22 is compressed between nut 21 and a central pan 23 fixed to diaphragm 15, whereby spring 22 biases the diaphragm against the pressure of gas in chamber 16, such bias being adjustable by turning nut 21. A threaded cap 24 closes the upper end of boss 18.

A reset rod 25 has a threaded end 26 extending through the diaphragm into the threaded bore 27 of a post 28. A washer 29 is interposed between the post and diaphragm 15, and a washer 31 is disposed between pan 23 and a nut 32 on rod 25. When nut 32 is drawn tight rod 25, diaphragm 15 and post 28 are secured tightly together. The upper end of rod 25 extends up into the interior of cap 24 for access when the cap is removed.

Cover 13 is formed with an opening 33 to chamber 17, normally closed by a pressure-responsive valve 34 biased closed by spring 35. Should the pressure in chamber 17 exceed a predetermined amount above atmospheric, this will open valve 34 against the force of spring 35 to permit exhaust through passage 36.

At one side lower case member 12 is formed with a hollow coupling boss 37 containing radial webs 38 supporting a central guide 39 lined with a bearing sleeve 41 slidably mounting a main or throttle valve stem 42.

Within chamber 16, a bell crank lever 43 is pivoted on the case at 44. One arm 45 of lever 43 is rockably slidably connected to diaphragm post 28, and the other bellcrank arm 46 is rockably slidably connected to one end of valve stem 42.

A throttle valve head 47 is removably secured on stem 42 by a fastener 48, and the face of head 47 carries a resilient valve seat disc 49.

A regulator body member 51 has opposite threaded ends 52 and 53 adapted for connection respectively to a gas delivery or inlet and service or outlet conduits (not shown) the arrows indicating the direction of gas flow.

Body 51 is formed at one side with a coupling boss 54 having a shoulder 55 for abutment seating against the end of boss 37. Boss 54 is externally threaded at 55 to mount a threaded coupling sleeve 56 which coacts with a snapring 57 seated in an external groove on coupling 37 to draw the diaphragm casing and regulator body into rigid gastight engagement at shoulder 55, so that body 51 becomes in effect a rigid extension of case 11.

Within body 51 the gas inlet and outlet are separated by an internal wall 58 having a threaded bore 59 fixedly mounting an annular valve seat member 61 having a central flow passage 62. As shown seat member 61 has a projecting annular seating lip 63 against which presses resilient valve seating 49 when the regulator main valve is closed.

At the other side of body 51 is an aperture 64 coaxial with passage 62 and into which projects a boss 65 integral with the body 66 of a high-pressure cutoff control device indicated at 67. A sidewall 68 of body 66 is secured upon the side of regulator body 51 as by a series of capscrews 69. Resilient O-rings 71 and 72 compressed respectively between boss 65 and the regulator body within aperture 64 and between the sides of bodies 51 and 66 provide a gastight sealed connection between bodies 51 and 66.

A cover 73 is secured upon body 66 as by a series of screws 74, and a flexible diaphragm 75 clamped gastight at its outer periphery between the cover 73 and body 66 separates a high-pressure gas control chamber 76 from spring chamber 77. Chamber 77 is exposed to atmosphere through an opening 78 which may contain a filter.

A coiled spring is compressed between a washer 81 engaged by an adjustment screw 82 and the central gas assembly 83 of diaphragm 75 to bias diaphragm 75 downwardly.

A high-pressure cutoff stem 84 is slidably supported in a bushing 85 and a bore 86 in a wall 87 of body 66. Stem 84 is coaxial with main valve passage 62 and its outer end projects into an external body cavity 88 closed by a threaded cap 89. Within the cavity 88, stem 84 carries an axially fixed annular clip 91, and a high-pressure cutoff compression spring 92 disposed between clip 91 and cap 89 biases stem 84 inwardly, to the left in FIG. 1 and 2.

The inner end 93 of stem 84 is of reduced diameter so as to provide an inwardly axially facing latching shoulder 94 on the stem within bore 86, and stem end 93 extends slidably through a body wall bore 95 lined with a bushing 96 into the interior of boss 65, a gastight compression seal ring being provided at 97.

The inner end of stem section 93 supports a cutoff valve assembly 98 that is axially displaceable thereon.

Cutoff valve assembly 98 comprises a cylindrical capsule or closed hollow shell or cylinder 99 closed at its front end by a wall 101 and at its rear end by a wall plug 102 having a central reentrant boss 103 that slidably receives the inner end of stem section 93.

Figure 2:
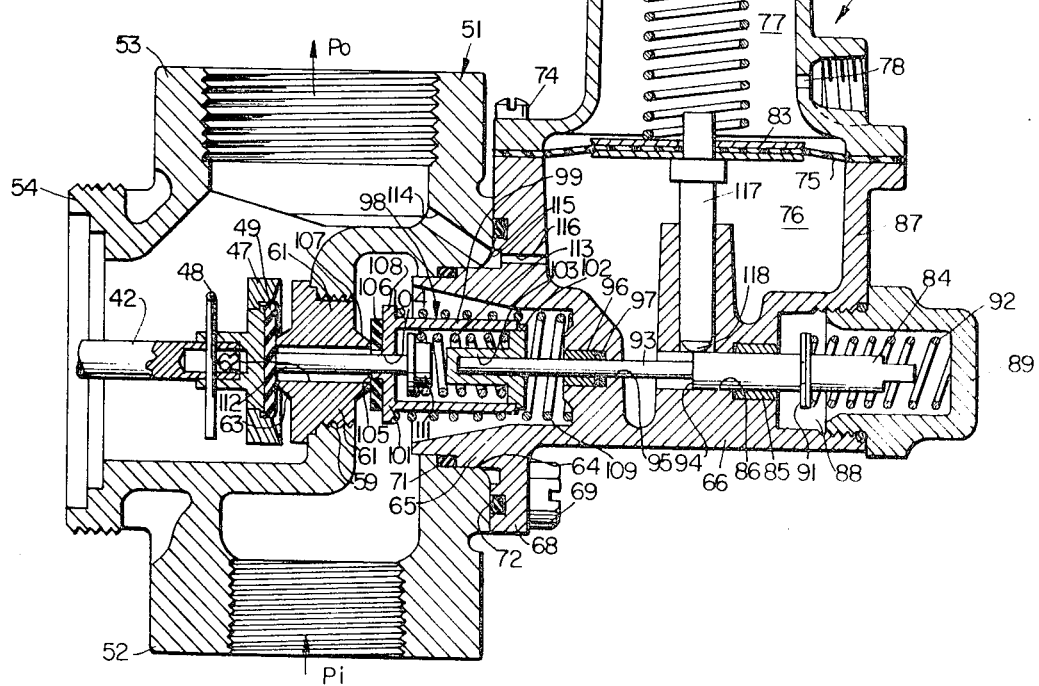
FIG. 2 is an enlarged section showing the regulator of FIG. 1 in high-pressure cutoff condition; and, FIG. 3 is a section similar to FIG. 2 showing the regulator in low-pressure cutoff condition.

The front wall 101 of the high-pressure cutoff valve assembly 98 is formed with a central aperture 104 surrounded by a boss 105 on which is secured an annular valve seat disc 106 of resilient material adapted to seat on an annular projecting lip 107 of valve seat member 61 when the parts are in the FIG. 2 position as will appear. Shell 99 has an external front wall flange 108, and a surrounding low-pressure cutoff compression spring 109 disposed between flange 108 and the body wall biases the valve assembly 98 toward the closed valve condition of FIG. 2.

Within shell 99 is the enlarged head 111 of an abutment rod or stem 112 slidably extending through aperture 104 and into passage 62. A coiled cutoff biasing spring 113 surrounds boss 103 and is compressed between end wall 102 and head 111 so as to bias abutment rod 112 to the left in FIGS. 1 and 2.

The gas inlet pressure at one side of the throttle valve 47 is indicated at $P_i$, and the gas outlet or downstream pressure is indicated at the other side of the throttle valve at $P_o$. A wall passage 114 in body 51 connects with an annular collector passage 115 disposed between bodies 51 and 66, and a passage 116 in body 66 connects the ring passage 115 to control pressure chamber 76 below diaphragm 75, whereby chamber 76 is always at downstream pressure $P_o$. These passages are all inwardly of static seal 72. By providing a ring passage at 115 there is no assembly problem for interconnecting passages 114 and 116, in a number of different relatively rotated positions of bodies 51 and 66.

Secured to diaphragm 75 is a latch member 117 that (FIG. 1) during normal operation has its tip 118 engaged against shoulder 94 of retracted stem 84, and during high-pressure cutoff operation is drawn upward by diaphragm 75 to the FIG. 2 position, where stem 84 is unlatched and may be displaced to the left by spring 92.

OPERATION

Referring to FIG. 1, when there is no gas passing through the system and no gas pressure in chamber 16 throttle valve 47 is urged tightly closed upon seat lip 63 by spring 22 acting through the diaphragm 15, bellcrank lever 43 and rod 42. At this time, the cutoff valve assembly 98 is inactive being located as shown in FIG. 1 in spaced relation to valve seat lip 107, and stem 84 is latched in retracted position as shown in FIG. 1. At the same time, low-pressure cutoff spring 108 is urging cutoff valve assembly 98 toward closed valve position, but the cutoff valve assembly cannot close because abutment rod 112 is engaged with throttle valve 47 and it acts by force transmitted through spring 113, which is stiffer and stronger than spring 109, reacting against abutment rod head 111 to hold the cutoff valve assembly 98 retracted as shown in FIG. 1.

When gas flows through the regulator body, the pressure displaces throttle valve 47 off its seat, to the left in FIGS. 1 and 2, and delivery of gas starts through the outlet at 53. The gas pressure downstream of throttle valve 47 is immediately effective in diaphragm chamber 16 to act on one side of diaphragm 15 in opposition to spring 22, and it is also effective through passages 114, 115 and 116 within high-pressure control diaphragm cutoff chamber 76.

As the pressure increases within chamber 16, with increased flow of gas through the throttle valve, diaphragm 15 will be displaced upwardly against the force of spring 22. This is accompanied by translation of the upward movement of diaphragm 15 into clockwise rocking of bellcrank 43 to tend to displace throttle valve head 47 back toward the seat lip 63. Depending upon the adjusted strength of spring 22, eventually throttle valve head 47 becomes more or less stabilized at a position of relative opening of the throttle valve 47 that corresponds to a desired output pressure $P_o$ in chamber 16 and being delivered to the appliances or the like.

As long as the line pressure $P_i$ remains constant this condition will hold and, should line pressure $P_i$ surge or otherwise vary to produce a different output pressure $P_o$, diaphragm 15 will be immediately activated to change the throttle valve position to act to maintain the output pressure constant. The foregoing is normal gas pressure regulator action, and it is reliable within a range between predetermined low and high line pressure limits.

As long as the output pressure $P_o$ is below a predetermined high value, stem 84 will remain latched by virtue of spring 79 retaining latch rod 117 against shoulder 94 and thereby preventing high-pressure cutoff spring 92 from expanding.

Figure 3:
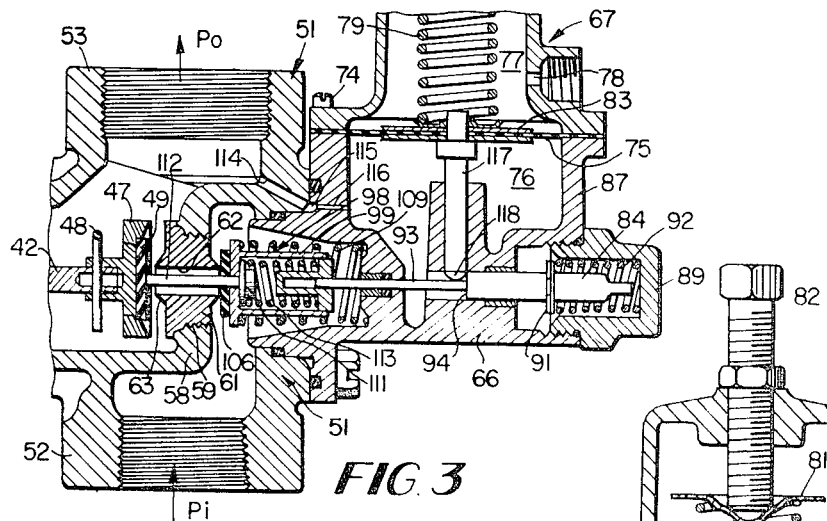

Should the line pressure $P_i$ drop sufficiently that the resultant low output pressure effective in chamber 16 is below a predetermined low value, then throttle valve head 47 will be moved to the left toward wide open position. As valve head 47 moves to the left, abutment rod 112 will follow and cutoff valve assembly 98 will displace to the left under the force of expanding low-pressure spring 109 until valve seat disc 106 engages lip 107 as shown in FIG. 3 to shut off gas flow through the regulator. During this operation, the relative position of abutment rod 112 with respect to the cutoff valve assembly 98 is unchanged.

When the low-pressure condition has been corrected, the operator may remove cap 24 and pull upwardly on stem 25 to rock bellcrank 43 and move throttle valve head 47 toward seat lip 63. As it moves to close, throttle head 47 acts through abutment rod 112 and spring 113, which is stiffer than spring 109, to displace the cutoff valve assembly back toward the FIG. 1 position where it is spaced from seat lip 107.

During the foregoing low-pressure cutoff operation, the cutoff valve assembly 98 slides upon the reduced end 93 of latched stem 84 which does not move. FIG. 3 shows the parts at the end of the low-pressure cutoff operation.

Should output pressure $P_o$ rise above a predetermined valve, which may be due to a broken or frozen bellcrank 43 permitting uncontrolled movement of or holding head 47 away from seat lip 63 high-pressure cutoff displacement of cutoff valve assembly 98 takes place. This is effected when the pressure $P_o$ transmitted to chamber 76 becomes sufficient to upwardly displace diaphragm 75 against the adjusted strength of spring 79 to remove latch rod 117 out of the path of shoulder 94 and enable high-pressure cutoff spring 92 to displace stem 84 to the left toward the FIG. 2 position where stem end 93 bottoms in boss 103 and cutoff valve assembly 98 moves until valve seat 106 closes against seat lip 107. FIG. 2 shows the parts in high-pressure cutoff position.

The high pressure in chamber 16, assuming the motion transmitting linkage between the diaphragm 15 and head 47 to remain operative, has moved throttle valve head 47 toward lip 63 where it remains in abutment with rod 112, but this does not prevent the cutoff valve assembly 98 from closing because the solid bottomed connection of latch stem 84 within the cutoff valve assembly overcomes and compresses the spring 113 whereby cutoff valve assembly 98 moves to the left relative to and along abutment rod 112. The depth of boss 103 permits this displacement.

The high-pressure cutoff will remain in this condition now regardless of line pressure change and, in order to reset latched stem 84 when the condition is corrected, the operator removes cap 89 and pulls stem 84 outward until latch rod 117 is spring projected into the path of shoulder 94. This enables spring 113 to expand and displace the cutoff valve assembly 98 along stem end 93 to the right away from seat lip 107 to reassume the FIG. 1 position.

In the invention the cutoff valve assembly 98 is essentially a sealed unit internally protected against dirt and line impurities. This is important because cutoff valves may normally not be operated except at extremely infrequent intervals. The cutoff valve assembly is moreover activated toward both low- and hightcutoff conditions by springs, and the mounting of stem 84 in bushing minimizes the change of the stem freezing.

A particular advantage of the invention is that inspection of a shutoff regulator will indicate whether the difficulty is too high or too low pressure. If the shutoff is due to too low pressure, the regulator can be reset by removing cap 24 and pulling up on the reset rod. If the difficulty is too high pressure this will not reset the regulator.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A gas pressure regulator comprising a main valve controlling flow of gas therethrough and means responsive to downstream gas pressure for actuating said main valve to regulate the downstream gas pressure, a cutoff valve adapted for controlling flow of gas through said regulator, and means in said regulator responsive respectively to downstream gas pressures below and above predetermined limits for actuating said cutoff valve to arrest flow of gas through said regulator.

2. A gas pressure regulator as defined in claim 1, wherein said main valve comprises a valve-seating member positioned by the main valve-actuating means, and the means for actuating said cutoff valve in response to pressure below the lower limit is operatively connected to be controlled by the position of said main valve member.

3. A gas pressure regulator as defined in claim 2, wherein said cutoff valve comprises a seating member spring-biased toward cutoff position, and said operative connection comprises a direct motion-transmitting means extending between said main valve member and said cutoff valve member.

4. A gas pressure regulator as defined in claim 1, wherein said main valve comprises a valve-seat member positioned by the main valve-actuating means, and said cutoff valve comprises a movably mounted valve-seating member, and the means for actuating said cutoff valve in response to pressure above the upper limit comprises spring-biased means operatively connected to said cutoff valve-seating member and normally retained inactive by latch means responsive to said downstream gas pressure.

5. A gas pressure regulator as defined in claim 4, wherein said means for actuating the cutoff valve member comprises a reciprocable stem having a lost motion connection with said cutoff valve member.

6. A gas pressure regulator as defined in claim 5, wherein said latch means comprises a pressure-responsive diaphragm exposed to downstream gas pressure and connected to a latch rod adapted to engage a formation on said stem to oppose displacement of said stem by said spring biasing means.

7. A gas pressure regulator as defined in claim 1, wherein said cutoff valve comprises a substantially closed cylinder slidably supported in said regulator and having a valve seat on one end.

8. A gas pressure regulator as defined in claim 7, wherein said means for actuating said cutoff valve for high-pressure cutoff comprises a reciprocable stem on which said cylinder is slidably mounted.

9. A gas pressure regulator comprising means defining an annular valve seat surrounding a gas flow passage, a cutoff valve assembly disposed adjacent said valve seat, a low-pressure cutoff spring-biasing said cutoff valve assembly toward said seat and means for preventing movement of said cutoff valve assembly toward said seat by said spring when the downstream gas pressure is above a predetermined value, a latched stem operatively connected to said cutoff valve assembly, means responsive to a predetermined high downstream gas pressure to unlatch said stem, and spring means for displacing said stem to move said cutoff assembly to engage the seat when said stem is unlatched.

10. A gas pressure regulator comprising a body having an inlet and an outlet and an internal wall provided with an aperture disposed between the inlet and outlet, means providing annular valve seats surrounding said aperture at opposite sides of said wall, a main diaphragm controlled valve assembly mounted on said body and having a valve head adapted to engage the valve seat at one side of the wall, said main valve assembly being responsive to downstream gas pressure and connected to so locate said valve head relative to the associated valve seat as to normally provide a substantially constant downstream pressure, a cutoff valve assembly at the other side of said wall comprising a movably mounted valve member adapted to engage the other valve seat, low-pressure cutoff means comprising low-pressure cutoff spring means biasing said valve member toward said other valve seat, and means responsive to the position of said main valve head for opposing movement of said valve member toward shutoff position.

11. A gas pressure regulator as defined in claim 10, including normally latched high-pressure cutoff mechanism operably connected to said valve member, and means responsive to a predetermined high downstream gas pressure for unlatching said mechanism.

12. A gas pressure regulator as defined in claim 10, wherein said valve member is slidably mounted and has an apertured valve seat on one end, and said means opposing movement of the valve member toward shutoff position comprises a stem slidably mounted on said member to project from said one end through said aperture into abutment with said main valve head, and resilient means in said valve member for biasing said stem toward said projected position.

13. A gas pressure regulator as defined in claim 12, wherein said resilient means is stronger than said low-pressure cutoff spring means.

14. A gas pressure regulator as defined in claim 12 wherein said valve member is a cylinder and said low-pressure cutoff spring means is compressed between said cylinder and said regulator body, said stem has an enlarged head within the cylinder, and said resilient means comprises spring means within the cylinder of greater strength than the low-pressure cutoff spring means compressed between said stem head and the other end of said cylinder.

15. A gas pressure regulator as defined in claim 11, wherein said high-pressure cutoff means comprises a spring-biased slidable stem having a slidable lost motion connection at one end with said valve member.

16. A gas pressure regulator as defined in claim 14, wherein said valve member is a cylinder having a valve seat on said one end and a reentrant boss at the other end, and said high-pressure cutoff means comprises a spring-biased stem extending into said boss.

17. A gas pressure regulator comprising a regulator body containing an internal valve seat surrounding a flow passage, a main valve actuated in the response to downstream pressure for normally controlling flow through said passage, a movably mounted cutoff valve adapted to close said passage, and means for moving said cutoff valve to closed position comprising a diaphragm assembly having a body rigidly secured to the regulator body and containing a pressure chamber and diaphragm operated normally latched mechanism operably connected to said valve assembly, passage means in the walls of said regulator and diaphragm assembly bodies connecting the downstream side of the regulator to said diaphragm pressure chamber, said passage means comprising an annular passage section between said bodies permitting assembly in different relatively rotated positions of said bodies, and means providing a fluidtight seal between said bodies in surrounding relation to said annular passage section.

* * * * *